US007855846B2

(12) United States Patent
Chikami

(10) Patent No.: US 7,855,846 B2
(45) Date of Patent: Dec. 21, 2010

(54) IMAGING UNIT AND ELECTRONIC DEVICE USING THE SAME

(75) Inventor: Mototaka Chikami, Hachioji (JP)

(73) Assignee: Konica Minolta Opto, Inc., Tokyo (JP)

(*) Notice: Subject to any disclaimer, the term of this patent is extended or adjusted under 35 U.S.C. 154(b) by 226 days.

(21) Appl. No.: 12/187,243

(22) Filed: Aug. 6, 2008

(65) Prior Publication Data

US 2009/0040633 A1 Feb. 12, 2009

(30) Foreign Application Priority Data

Aug. 9, 2007 (JP) .................. JP2007-208087

(51) Int. Cl.
*G02B 7/02* (2006.01)
(52) U.S. Cl. .................. 359/824; 359/814; 396/52; 396/55; 348/208.99; 348/208.11; 348/208.13
(58) Field of Classification Search .................. 359/824
See application file for complete search history.

(56) References Cited

U.S. PATENT DOCUMENTS

| 5,305,040 | A | * | 4/1994 | Enomoto | .................. | 396/55 |
|---|---|---|---|---|---|---|
| 5,774,266 | A | * | 6/1998 | Otani et al. | .................. | 359/554 |
| 5,905,917 | A | * | 5/1999 | Imura | .................. | 396/55 |
| 6,091,900 | A | * | 7/2000 | Kaneda et al. | .................. | 396/55 |
| 2006/0033818 | A1 | * | 2/2006 | Wada et al. | .................. | 348/208.11 |
| 2006/0088304 | A1 | * | 4/2006 | Aoshima | .................. | 396/85 |
| 2006/0238903 | A1 | * | 10/2006 | Sato et al. | .................. | 359/824 |
| 2007/0041721 | A1 | * | 2/2007 | Ito et al. | .................. | 396/55 |

FOREIGN PATENT DOCUMENTS

JP  2006-279368  10/2006

* cited by examiner

*Primary Examiner*—Jessica T Stultz
(74) *Attorney, Agent, or Firm*—Cohen Pontani Lieberman & Pavane LLP

(57) ABSTRACT

An imaging unit, including: a lens housing section to accommodate a lens; a lens driving section, including: a moving member which supports the lens and moves the lens in an optical axial direction, and an electro-mechanical transduction element to drive the moving member in the optical axial direction; a camera-shake preventing section which drives the lens housing section to prevent camera-shake; and a rotation regulating section to prevent the lens from rotating around an optical axis.

7 Claims, 10 Drawing Sheets

IMAGING UNIT AND ELECTRONIC DEVICE USING THE SAME

CROSS REFERENCE TO RELATED APPLICATION

This application is based on Japanese Patent Application No. JP2007-208,087 filed on Aug. 9, 2007, with the Japanese Patent Office, the entire content of which is hereby incorporated by reference.

TECHNICAL FIELD

The present invention relates to an imaging unit and an electronic device using the same.

BACKGROUND OF THE INVENTION

In recent years, due to the popularization of cellular phones incorporating camera functions, small-sized imaging units have been developed, which are able to be mounted in various portable electronic devices. Unexamined Japanese Patent Application Publication Number 2006-279,368, discloses an imaging unit which incorporates a zoom lens using an auto focusing method, and an imaging unit which has a camera-shake preventing function. Generally, in said auto focusing imaging unit, a movable lens unit is provided in front of an imaging element having a rectangular imaging area (that is, the movable lens unit is provided on the subject side with respect to the imaging element), and a light-amount controlling devices, such as a shutter and a diaphragm, are provided in front of the movable lens unit. In imaging unit 101 (see FIG. 12) disclosed in above Patent Document, smooth impact drive mechanism 120 (hereinafter referred to as "SIDM 120") is employed to serve as a driving source of movable lens unit 102. SIDM 120 is a translatory movement actuator, activated by not only rapid volume change of a piezoelectric element, being not illustrated, but also by inertia and friction of moving body 125.

SIDM 120 is structured of: a main body including a holding section (which is not illustrated), a piezoelectric element, and driving shaft 123, connected in said order; and moving body 125 which is connected to driving shaft 123 with friction, wherein moving body 125 supports movable lens unit 102 so that, in imaging unit 101, SIDM 120 is employed as a driving source of the zooming function.

In imaging unit 101, incorporating auto-focusing movable lens unit 102 shown in FIG. 12, movable lens unit 102 tends to slightly rotate around an optical axis for auto-focusing so that captured images tend to become blurred. In order to prevent said blurred image, mounted is rotation regulating mechanism 150 (serving as a rotation regulating section) of movable lens unit 102. Said rotation regulating mechanism 150 is structured of concave section 152, formed on moving body 125 to support movable lens unit 102, and convex section 151 to slidably engage said concave section 152. A small clearance is provided between concave section 152 and convex section 151 so that movable lens unit 102 can move smoothly in the optical axial direction. At the image capturing moment, movable lens unit 102 becomes stationary on the optical axis, whereby said clearance between concave section 152 and convex section 151 does not adversely work on the image capturing operation.

However, if a camera-shake preventing function is to be applied on imaging unit 101, as disclosed in the above Patent Document, an XY-driving section is added, which drives moving body 125 to support movable lens unit 102, in a direction from right to left, and up and down (which are the XY directions), which are perpendicular to the optical axis, whereby moving body 125 may always be moved by said XY-driving sections, in the directions to overcome the camera-shake occurring in the XY directions. Accordingly, even when movable lens unit 102 becomes stationary in the optical axial direction at the image capturing moment, moving body 125 may be vibrated in the XY directions by the XY-driving section. That is, movable lens unit 102 may be vibrated due to micro-motion generated in the small clearance provided between concave section 152 and convex section 151, whereby the camera-shake preventing function cannot exert a greater effect at the image capturing moment, which has been a major problem.

SUMMARY OF THE INVENTION

Therefore, an object of the present invention is to provide an improved imaging unit which can capture an image exhibiting higher quality, in an imaging unit incorporating a movable lens unit and a camera-shake preventing function.

To attain the above object, an imaging unit includes:
a lens housing to accommodate a lens;
a lens driving section, including:
    a moving member to support the lens to move in an optical axial direction, and
    an electromechanical transduction element to drive the moving member in the optical axial direction;
a camera-shake preventing section which drives the lens housing to prevent camera-shake;
a rotation regulating section to prevent the lens from rotating around the optical axis; and
a back-lash preventing section to prevent the lens from moving in a rotating direction around the optical axis.

BRIEF DESCRIPTION OF THE DRAWINGS

FIGS. 1(a) and 1(b) are perspective views of a cellular phone, incorporating an imaging unit relating to the present embodiments, wherein FIG. 1(a) is a front view, while FIG. 1(b) is a rear view.

FIG. 9(a) is a front view to show the structure of relevant portions of the imaging unit relating to Embodiment 2, while FIG. 9(b) is an enlargement of area A shown in FIG. 9(a).

DETAILED DESCRIPTIONS OF THE PREFERRED EMBODIMENTS

Figure 1:
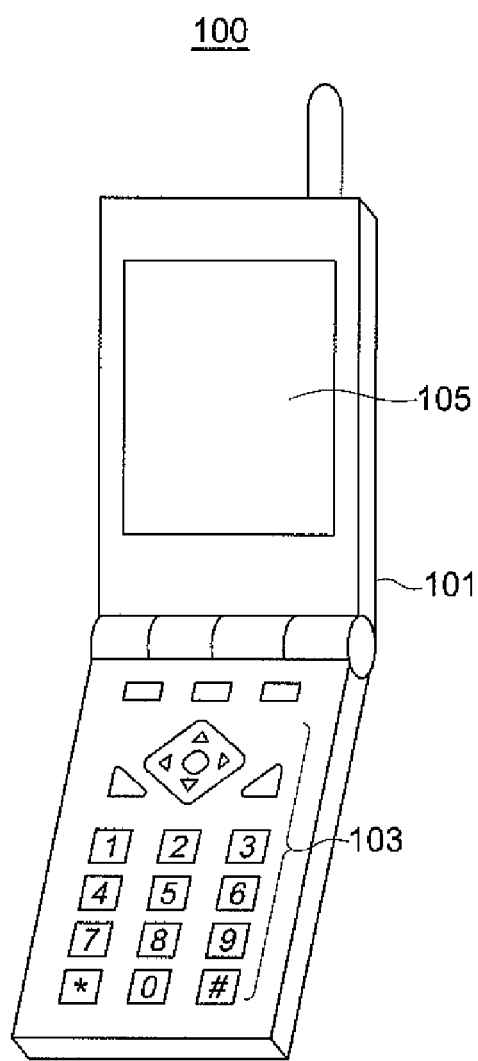
Figure 1:
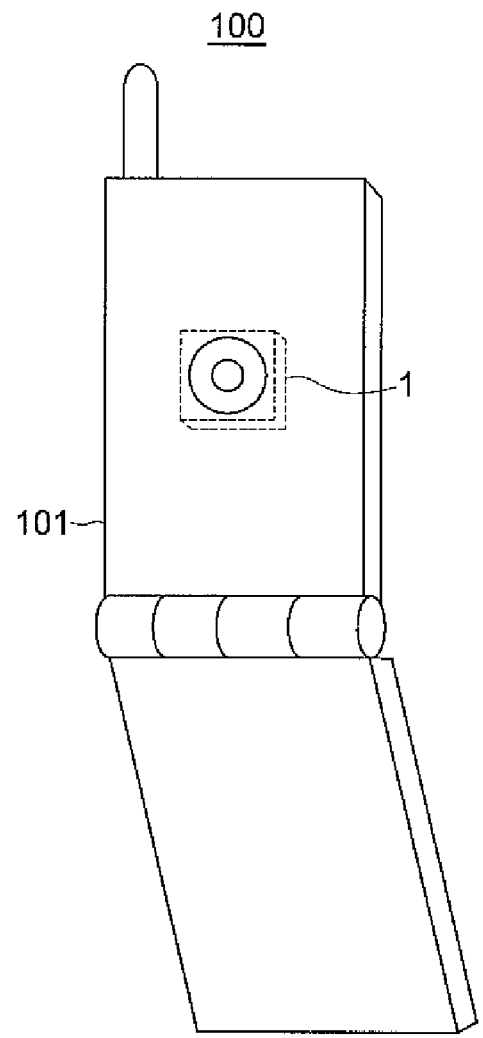

The preferred embodiments will now be detailed while referring to the drawings.

Embodiment 1

FIGS. 1(a) and 1(b) are the perspective views of cellular phone 100 shown as an electric device, incorporating an imaging unit relating to Embodiment 1, wherein FIG. 1(a) is a front view, while FIG. 1(b) is a rear view. As shown in FIGS. 1(a) and 1(b), cellular phone 100 includes imaging unit 1 in frame 101 which is a main body, display section 105 to display an image captured by imaging unit 1, and operation section 103 through which the user operates various functions.

Figure 2:
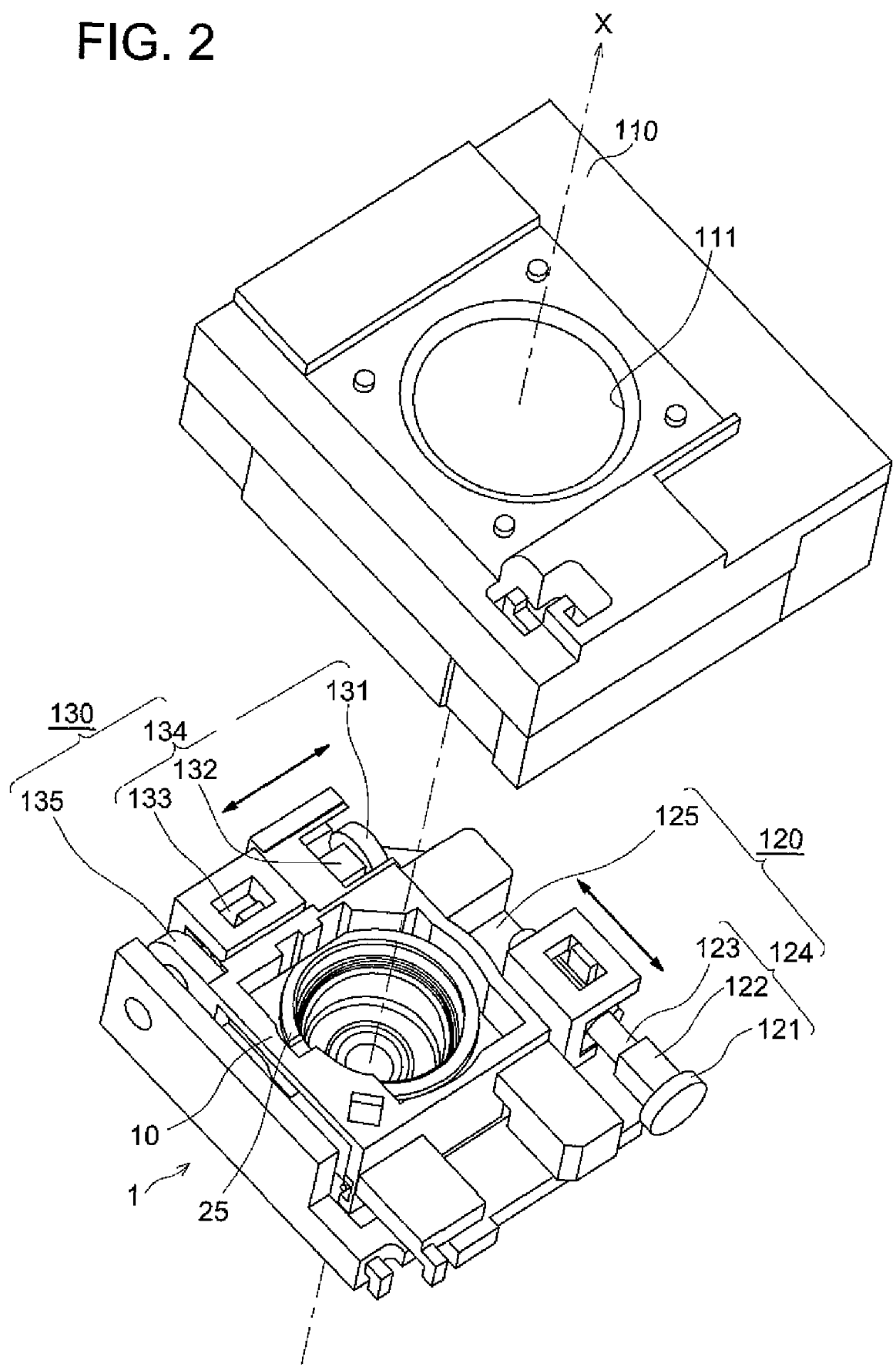
FIG. 2 is a perspective view to show the total structure of an imaging unit relating to Embodiment 1.
Figure 3:
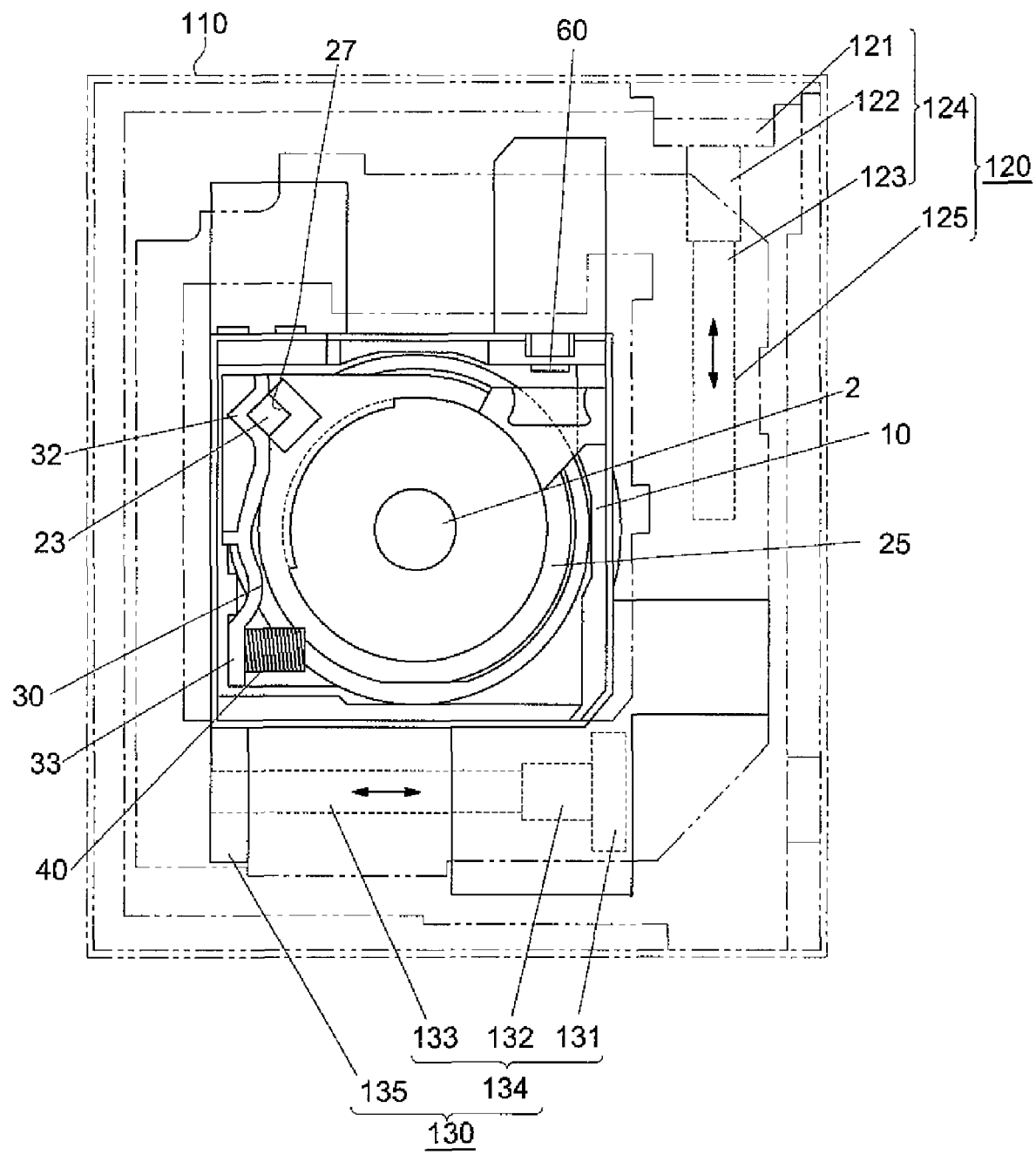
FIG. 3 is a schematic front view to show the structure of relevant portions of the imaging unit shown in FIG. 2.

FIG. 2 is the perspective view to show the total structure of imaging unit 1 relating to Embodiment 1, while FIG. 3 is the schematic front view to show the structure of imaging unit 1 shown in FIG. 2.

As shown in FIGS. 2 and 3, imaging unit 1 is mounted in case 110 having photographing opening 111, whereby imaging unit 1 is totally supported to be movable in a direction perpendicular to optical axis X (which are direction from right to left, and up and down). In detail, imaging unit 1 incorporates a camera-shake preventing function (which is conducted by a camera-shake preventing device), which corrects the shakes of imaging unit 1 occurring in the vertical direction and the horizontal direction due to shake of the user, during the image capturing operation. Said camera-shake preventing device is driven by two very small linear actuators, both of which are mounted perpendicular to the optical axis, and each being perpendicular, so that imaging unit 1 can freely move in the direction from right to left, as well as up and down.

In the present embodiment, SIDMs 120 and 130 (which are represented by Smooth Impact Drive Mechanisms, being a registered trademark) are employed as linear actuators to structure the above camera-shake preventing device. In FIGS. 2 and 3, SIDMs 120 and 130 are structured of main bodies 124 and 134, and moving bodies 125 and 135, respectively. Main bodies 124 and 134 include holding sections 121 and 122, piezoelectric elements 122 and 132, and driving shafts 123 and 133, respectively. Moving bodies 125 and 135 are frictionally engaged with driving shafts 123 and 133, respectively. Said SIDMs 120 and 130 are well-known translatory movement actuators, using the inertia and friction of moving bodies 125 and 135, as well as the rapid volume change of piezoelectric elements 122 and 132.

Holding section 121 of said SIDM 120 is mounted on housing 110, while moving body 125 is frictionally engaged with driving shaft 123 of SIDM 120. Further, holding section 131 of STDM 130 is mounted on moving body 125. Moving body 135, to support lens 2, is frictionally engaged with driving shaft 133 of SIDM 130, wherein driving shaft 133 of SIDM 130 is perpendicular to driving shaft 123 of SIDM 120, with respect to each axial direction. Still further, piezoelectric elements 122 and 132, connected to a control section, which is not illustrated, change their volume based on driving signals coming from said control section, to drive driving shafts 123 and 133 forward or backward. Accordingly, lens 2 can be driven quickly from right to left, as well as up and down so that any camera-shake, generated perpendicular to optical axial direction X, can be countered. Due to this structure, SIDMs 120 and 130 exert the function as the camera-shake preventing device, mounted on imaging unit 1, of the present invention. Still further, in the present embodiment, when moving body 135 is viewed in optical axial direction X, a nearly-rectangular frame is viewed in the center, which represents lens housing 10 (which will be detailed later) to house lens 2.

Said imaging unit 1 includes lens housing 10 to house lens 2, and lens driving device 20 to drive lens 2 in optical axial direction X.

In lens housing 10, a nearly-rectangle interior space, exhibiting a predetermined size, is formed. In said interior space, moving member 25 (which will be detailed later) to support lens 2 is accommodated, which is nearly round when it is viewed in optical axial direction X. Further, in lens housing 10, position detection sensor 60 is mounted to detect the position of lens 2 in optical axial direction X. In the present embodiments, a hall element is employed as position detection sensor 60. That is, due to the movement of moving member 25 in optical axial direction X, the magnetic field changes, whereby the position of lens 2 in optical axial direction X can be detected.

Lens driving device 20 includes moving member 25 which supports and allows lens 2 to move in optical axial direction X, and main body 24. Said main body 24 includes driving shaft 23 to frictionally engage moving member 25 provided in optical axial direction X, piezoelectric element 22, serving as an electro-mechanical converting element, which drives driving shaft 23 in its axial direction to move moving member 25 in optical axial direction X, and holding member 21 to support one end of piezoelectric element 22, wherein these sections 23, 22 and 21 are connected in the listed order. Said lens driving device 20 is represented by an SIDM, being an ultra-small sized linear actuator, employing the rapid volume change of piezoelectric element 22, and the inertia and friction of moving body 25, whereby lens driving device 20 functions as a driving source for a zooming function (which is also known as automatic focusing) to move lens 2 within imaging unit 1 in optical axial direction X.

Figure 5:
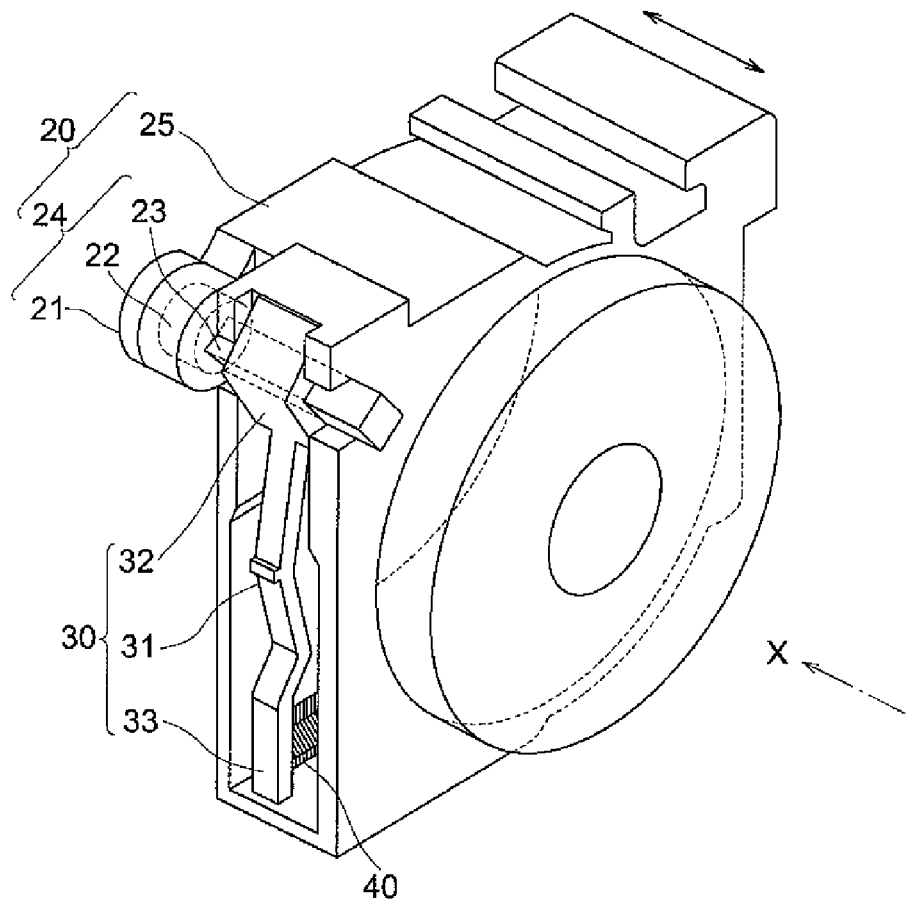
FIG. 5 is a perspective view of the structure of relevant portions of the imaging unit shown in FIG. 2.

In lens driving device 20, main body 24 is arranged at the left-upper portion of FIG. 5, wherein driving shaft 23 is parallel to optical axial direction X of lens 2. Moving member 25 includes lever 30 whose end portion 32 comes into contact with driving shaft 23, and coil spring 40 which pushes the other end portion 33 of lever 30 to press said end section 32 toward driving shaft 23.

In FIG. 3, lever 30, supported by moving member 25, is arranged from the left-upper portion to the left-lower portion in lens housing 10. Upper end portion 32 of lever 30 comes into contact with driving shaft 23, while lower end portion 33 of lever 30 comes into contact with coil spring 40 serving as a compression spring. An intermediate portion of lever 30 is bent toward the exterior side of lens housing 10, in which supporting point 31 is provided (See FIG. 4). Lower end portion 33 of lever 30 is continuously pressed toward an interior surface of lens housing 10 by coil spring 40, so that upper end portion 32 of lever 30 is continuously pushed toward driving shaft 23.

Driving shaft 23 is frictionally engaged between moving member 25 and upper end portion 32 of lever 30, pushed by coil spring 40 at lower end portion 33, whereby when driving shaft 23 vibrates in optical axial direction X due to the volume change of piezoelectric element 22, driving member 25 slides in one direction on driving shaft 23. Accordingly, lens 2 can be driven in optical axial direction X. In addition, a shutter driving device (which is a driving device of a light amount controlling section), not illustrated, is mounted on moving member 25.

The structure of driving shaft 23 and moving member 25 frictionally engaging said driving shaft 23 will be detailed below.

Figure 4:
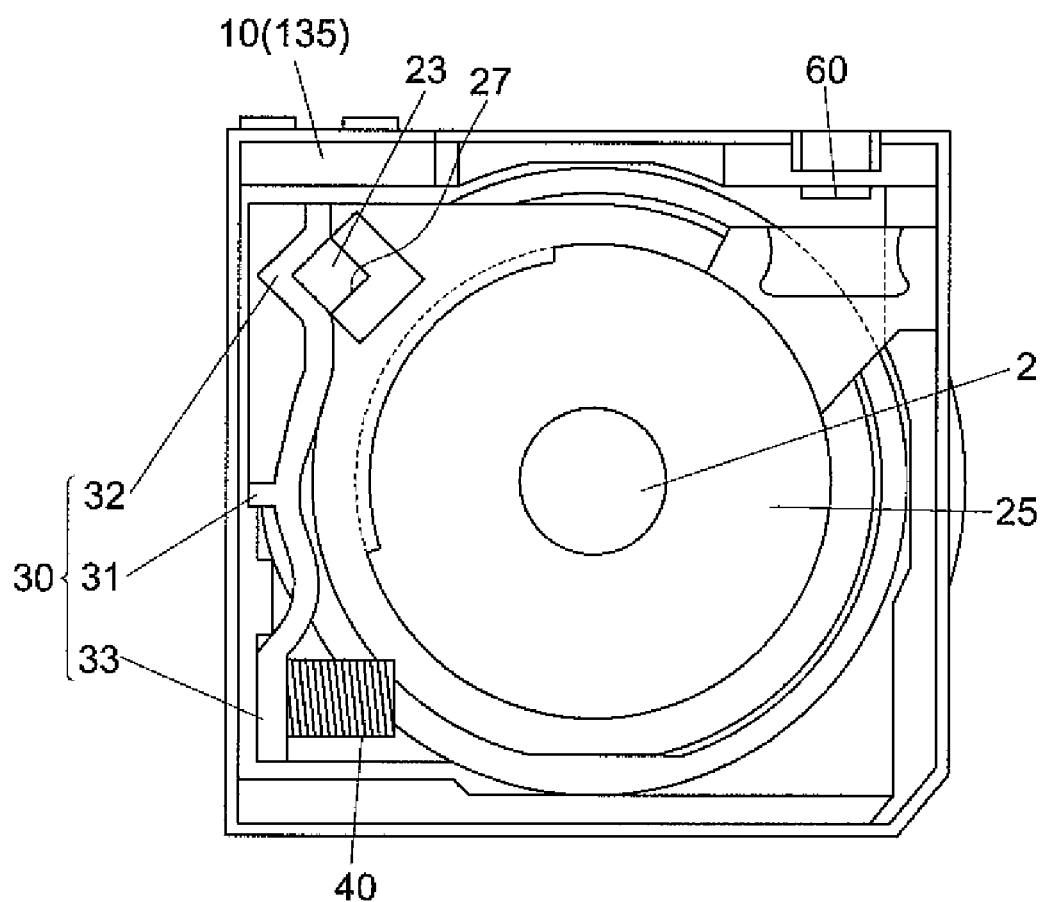
FIG. 4 shows an enlargement of relevant portions of the imaging unit shown in FIG. 3.

The cross section of driving shaft 23 in the present embodiments represents a quadrilateral as shown in FIGS. 3-5. Engaging section 27 of moving member 25, slidably engaging driving shaft 23, also represents a quadrilateral, when viewed in its cross section in optical axial direction X, being the same shape as driving shaft 23.

In more detail, driving shaft 23 is a quadrilateral cylinder, mounted along optical axial direction X, while engaging section 27 represents a concave surface contacting to an angled portion of driving shaft 23. Upper end portion 32 of lever 30, frictionally engaging driving shaft 23, represents a V-shape bent portion. Since coil spring 40 pushes lower end portion 33, upper end portion 32 is forced toward driving shaft 23, whereby said angled portion of driving shaft 23 is forced into contact with the concave surface of engaging section 27.

Figure 6:
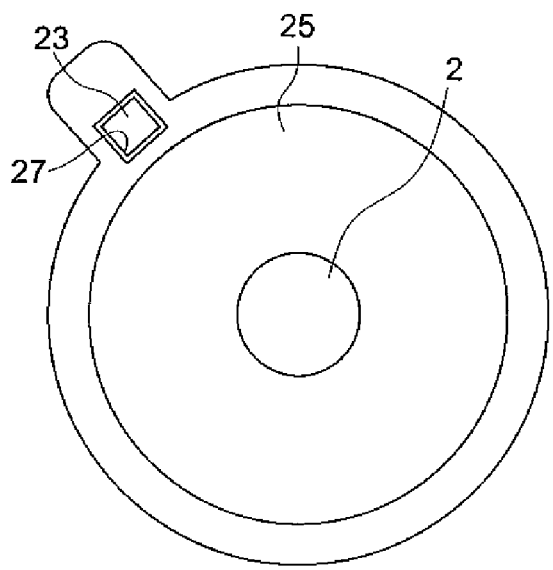
FIG. 6 is a schematic view to show the structures of relevant portions of an imaging unit relating to Embodiment 1.
Figure 7:
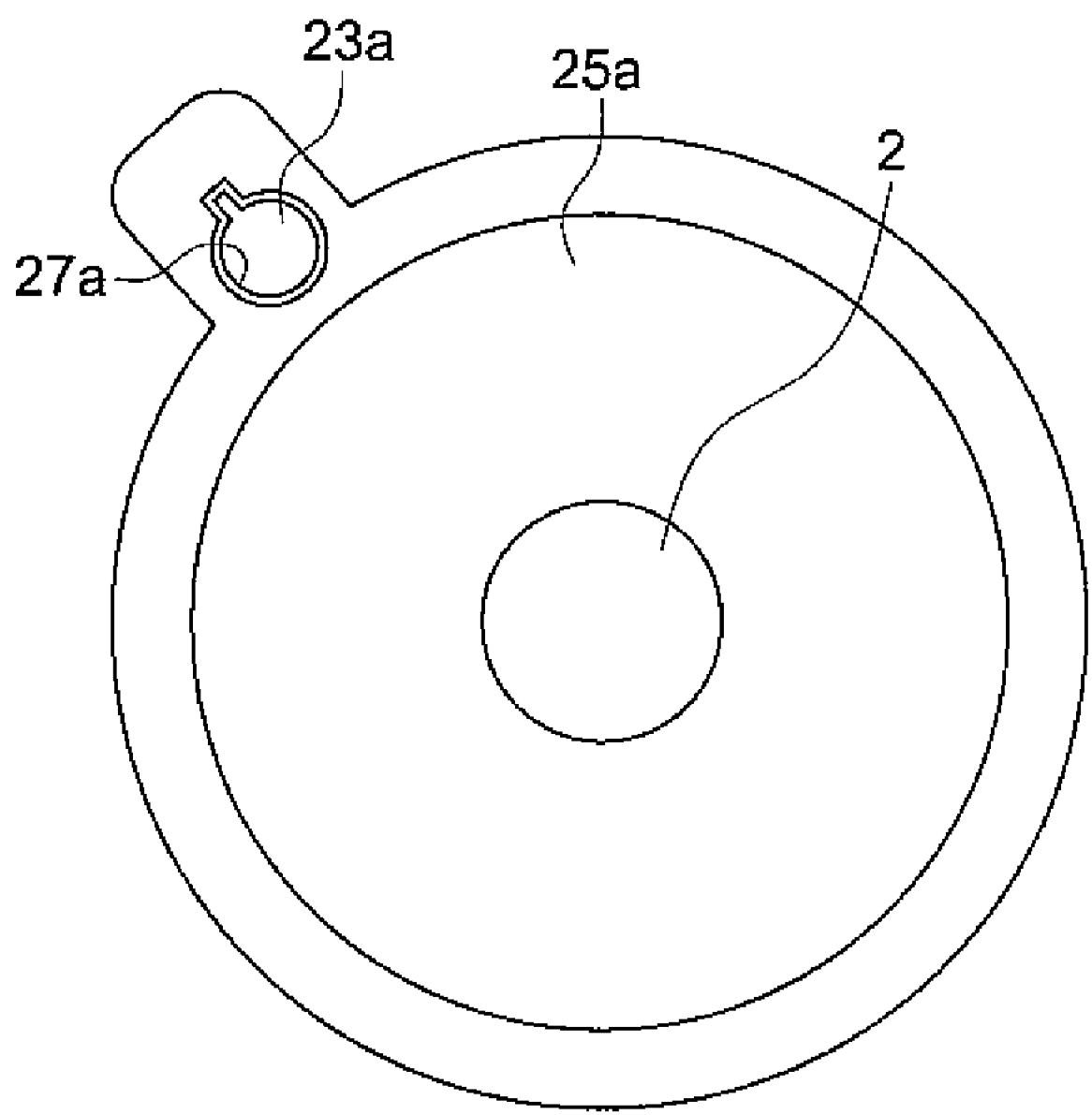
FIG. 7 is a schematic view to show another example relating to Embodiment 1.

Driving shaft 23 has more than two different gauging configurations in its cross sectional view perpendicular to an axial direction of the driving shaft, so that engaging section 27 provided on moving member 25 has the same shape as the cross sectional view perpendicular to the axial direction of driving shaft 23, to slidably engage driving shaft 23. Accordingly, driving shaft 23 engages engaging section 27 without any back-lash as shown in FIG. 6, so that moving member 25 is prevented from wobbling on driving shaft 23, whereby driving shaft 23 and engaging section 27 serve as the back-lash preventing section of the present invention, to prevent the back-lash in the rotating direction of lens 2. Further, driving shaft 23 and engaging section 27 also serve as the rotation regulating section of the present invention, because they regulate the rotation of lens 2 around optical axis X.

Still further, driving shaft 23 and engaging section 27 may be triangular or more, viewed in optical axial direction X, that is, viewed in the axial direction of both sections. Still further, driving shaft 23 may be driving shaft 23a, having more than one concave portion or more than one convex portion on its outer surface, and engaging section 27 is formed to be the same shape as said driving shaft 23a in the cross-sectional view, so that said driving shaft 23a can smoothly slide through engaging section 27a.

The specific function of imaging unit 1, having the above structure, will now be detailed.

While image capturing, piezoelectric element 22 is activated by driving signals coming from a control section, which is not illustrated, at predetermined timings, so that driving shaft 23 vibrates in optical axial direction X. Then, moving member 25 is driven in optical axial direction X by inertia and friction. If the camera-shake preventing function has been operated, at the same time as the above drive of moving member 25, SIDMs 120 and 130 are driven so as to reduce any vibration, generated by the user, from right to left, as well as up and down, whereby lens housing 10 storing moving member 25 to support lens 2 counters any motion from right to left, as well as up and down.

Since moving member 25 is supported while frictionally engaged to quadrangular driving shaft 23 between engaging section 27 and upper end 32 of lever 30, whose lower end portion 33 is pressed by coiled spring 40, in imaging unit 1 of the present embodiments, any movement due to the back-lash in the rotating direction around said driving shaft 23 is countered. Further, due to this, the adverse rotation of lens 2 around optical axial direction X is regulated.

Based on imaging unit 1 of Embodiment 1 described above, back-lash, in the rotating direction around optical axis X of lens 2, can be prevented by driving shaft 23 and engaging section 27, whereby moving member 25, which supports lens 2 and lens housing 10, can be integrally driven in a direction perpendicular to optical axis X. Therefore, when any unintended camera-shake is countered by SIDMs 120 and 130, back-lash of moving member 25 and lens 2 against lens housing 10 is effectively prevented, so that while photographing, any adverse movement of captured image, generated by SIDMs 120 and 130, is effectively reduced. Accordingly, concerning imaging unit 1, carrying movable lens 2 and the back-lash preventing section, imaging unit 1, which can capture high quality images by a simple structure, can be offered, and image quality via imaging unit 1 is improved.

Further, in lens driving section 20, driving shaft 23 has more than two different gauging configurations in its cross sectional view, and engaging section 27 engages and smoothly slides on driving shaft 23, whereby driving shaft 23 and engaging section 27 can structure the back-lash preventing section, which can effectively prevent any back-lash of imaging unit 1 without increasing the number of mechanical parts, compared to the conventional imaging units.

Still further, since driving shaft 23 and engaging section 27 can prevent the back-lash in the rotating direction around optical axis X of lens 2, the rotation regulating section doubles as the back-lash preventing section, whereby imaging unit 1, which can capture high quality images by a simple structure, can be offered, and quality of imaging unit 1 is improved. Still further, since driving shaft 23 and engaging member 27 of moving member 25, each being a quadrilateral when viewed in its cross section in the axial direction, structure the back-lash preventing section, driving shaft 23 and engaging section 27 are easily produced, whereby imaging unit 1, which can capture high quality images by a simple structure, can be offered, and quality of imaging unit 1 is improved.

Additionally, cellular telephone 100, as an electronic device incorporating imaging unit 1 to capture high quality images, can be offered on the market.

Embodiment 2

Figure 8:
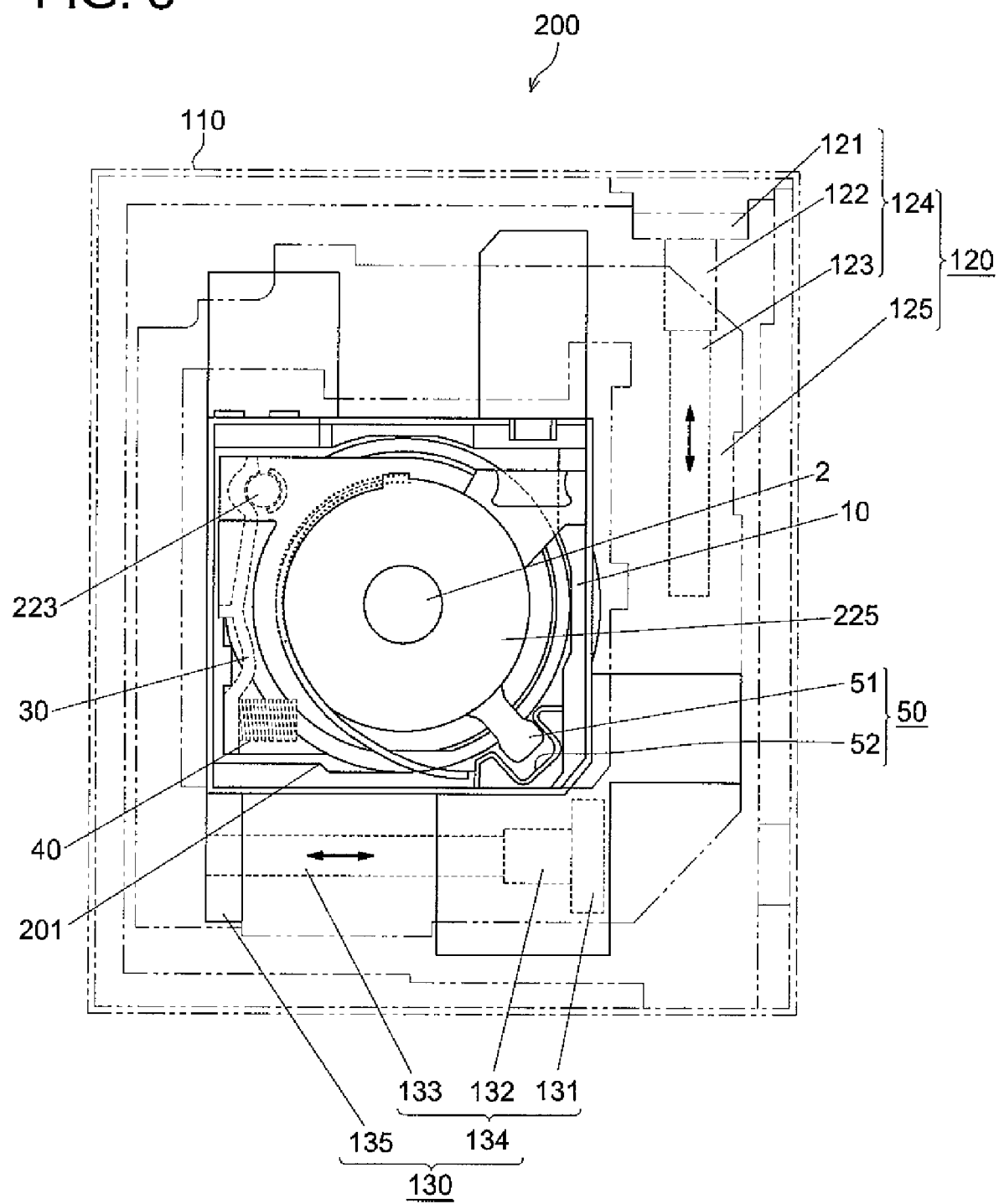
FIG. 8 is a schematic front view to show the structure of relevant portions of an imaging unit relating to Embodiment 2.
Figure 9:
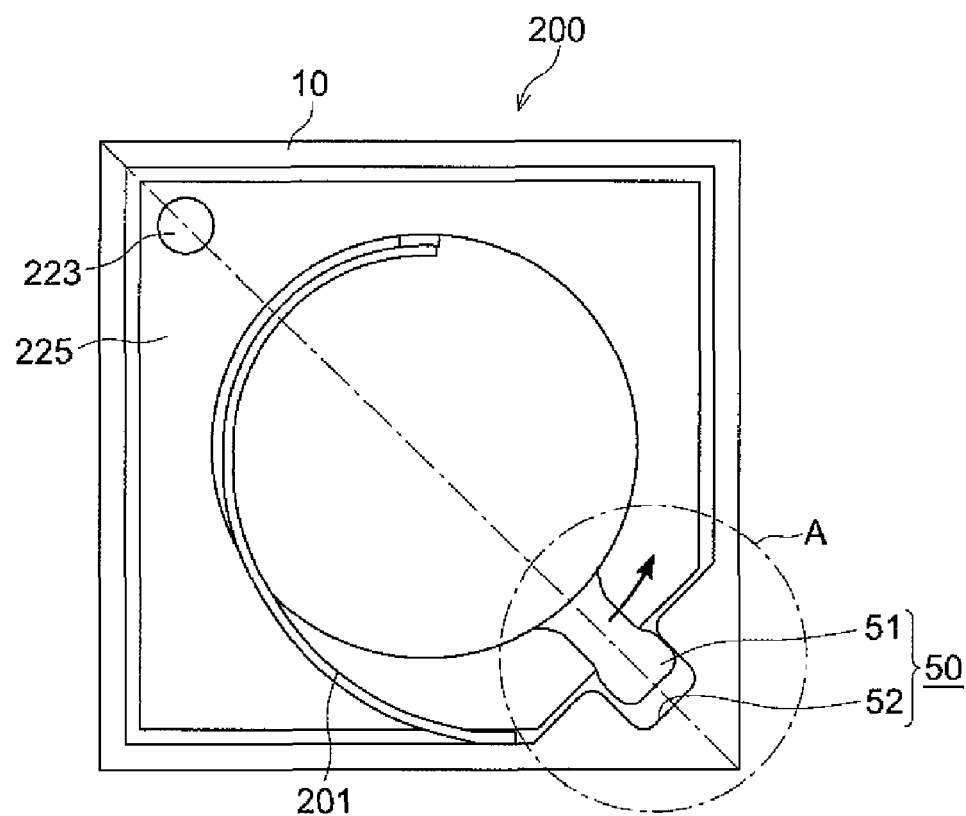
Figure 9:
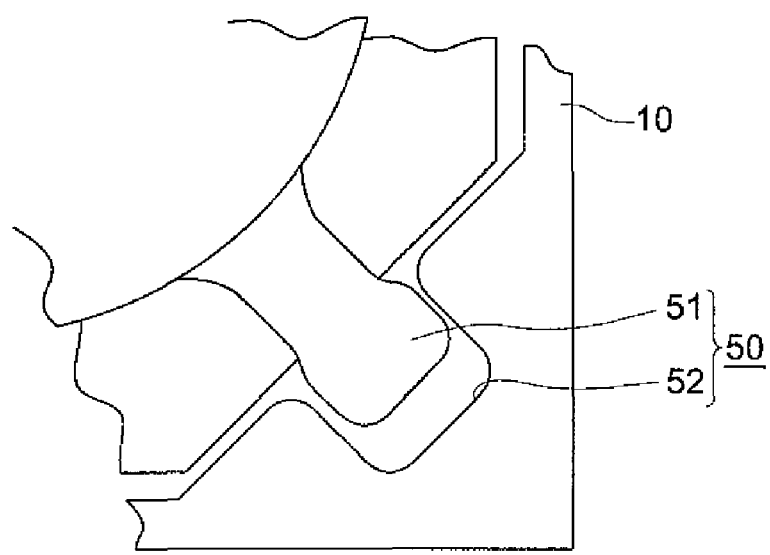

Imaging unit 200, relating to Embodiment 2 of the present invention, will now be detailed, while referring to FIGS. 8 and 9. In Embodiments 2 and 3, detailed below, the same designation numbers are applied to members having the same functions as the members of Embodiment 1, and redundant explanations will be omitted.

In imaging unit 200 relating to Embodiment 2 shown in FIG. 8, a back-lash preventing section incorporates spring member 201, which serves as an urging section to push lens 2 in one rotating direction around optical axis X, which is different in the structure from Embodiment 1. Further, in imaging unit 200 relating to Embodiment 2, SIDM, which structures lens driving device 20, incorporates cylindrical driving shaft 223, when viewed in the cross-section in optical axial direction X, and also incorporates moving member 225 which frictionally engages said driving shaft 223. Imaging unit 200 further incorporates rotation regulating section 50 which prevents lens 2 from rotating around optical axis X.

Rotation regulating section 50 includes convex section 51 which protrudes from one end of moving member 225 in the radial direction of lens 2, and also includes concave section 52 which is formed on an inner surface of lens housing 10 allows sliding engagement of convex section 51 in optical axial direction X. Due to the above structure of rotation regulating section 50, when lens driving device 20 drives moving member 25 and lens 2 in optical axial direction X, lens 2 is prevented from rotating around optical axis X.

In more detail, one end of spring member 201, being a wire spring, is latched on the inner surface of lens housing 10, while the other end is latched on moving member 225. In FIG. 9(a), spring member 201 pushes moving member 225 in the rotating direction, pivoting on driving shaft 223, specifically, spring member 201 pushes in the counterclockwise direction in FIGS. 8 and 9(a). Accordingly, in FIG. 9(b), convex section 51 is continuously pushed against an inner surface of concave section 52.

During image capturing, when piezoelectric element 22 is activated at predetermined driving timing, based on driving signals coming from the control section, which is not illustrated, driving shaft 223 vibrates in optical axial direction X so that moving member 225 moves in optical axial direction X by inertia and friction force.

According to imaging unit 200 of Embodiment 2, the same effect as Embodiment 1 is attained, and since Embodiment 2 has the back-lash preventing section having spring member 201 to push lens 2 in one rotating direction around optical axis X, lens 2 and moving member 225 to support lens 2 can be pushed in said one rotating direction around optical axis X. As a result, rotation regulating section 50 effectively prevents lens 2 from rotating in one rotating direction, that is, any back-lash in the rotating direction of lens 2 can be prevented by this simple structure.

Further, since a urging section can be structured by applying spring member 201 onto the conventional imaging unit, it is possible to offer imaging unit 200 and cellular phone 100 which can capture images exhibiting higher quality.

Still further, without considering the rotation of lens 2 in the other rotating direction of lens 2 around optical axis X, (which is clockwise rotation in FIGS. 8 and 9), the rotation regulating section can be structured so as to regulate the rotation of lens 2 in the other rotating direction around optical axis X, which is the counterclockwise rotation in FIGS. 8 and 9. Due to this structure, a back-lash preventing section can be mounted on imaging unit 200 as a simple structure, whereby it is possible to offer completive imaging unit 200 which can capture images exhibiting higher than current quality.

In addition, Embodiment 2 shown in FIGS. 8 and 9, structures lens 2 which is pushed counterclockwise by spring member 201, being perpendicular to optical axis X, however it is also possible to structure lens 2 which is pushed clockwise by spring member 201, also perpendicular to optical axis X. Further, not only the wire spring, but also various other springs, can be used for spring member 201.

Embodiment 3

Imaging unit 300 relating to Embodiment 3 as the present invention will be detailed below, while referring to FIGS. 10 and 11.

Imaging unit 300 relating to Embodiment 3 includes a pushing section (being a back-lash preventing section) structured of permanent magnet 301 mounted on lens housing 10, and iron member 302, serving as a magnetic body, mounted on moving member 25, accordingly, this structure differs greatly from Embodiments 1 and 2. In addition, imaging unit 1, relating to Embodiment 3, the SIDM, which structures lens driving device 20, incorporates cylindrical driving shaft 223, when viewed in its cross-section in optical axial direction X, and moving member 225 which frictionally engages said driving shaft 223. Imaging unit 300 further incorporates rotation regulating section 50 which prevents lens 2 from rotating around optical axis X.

Figure 10:
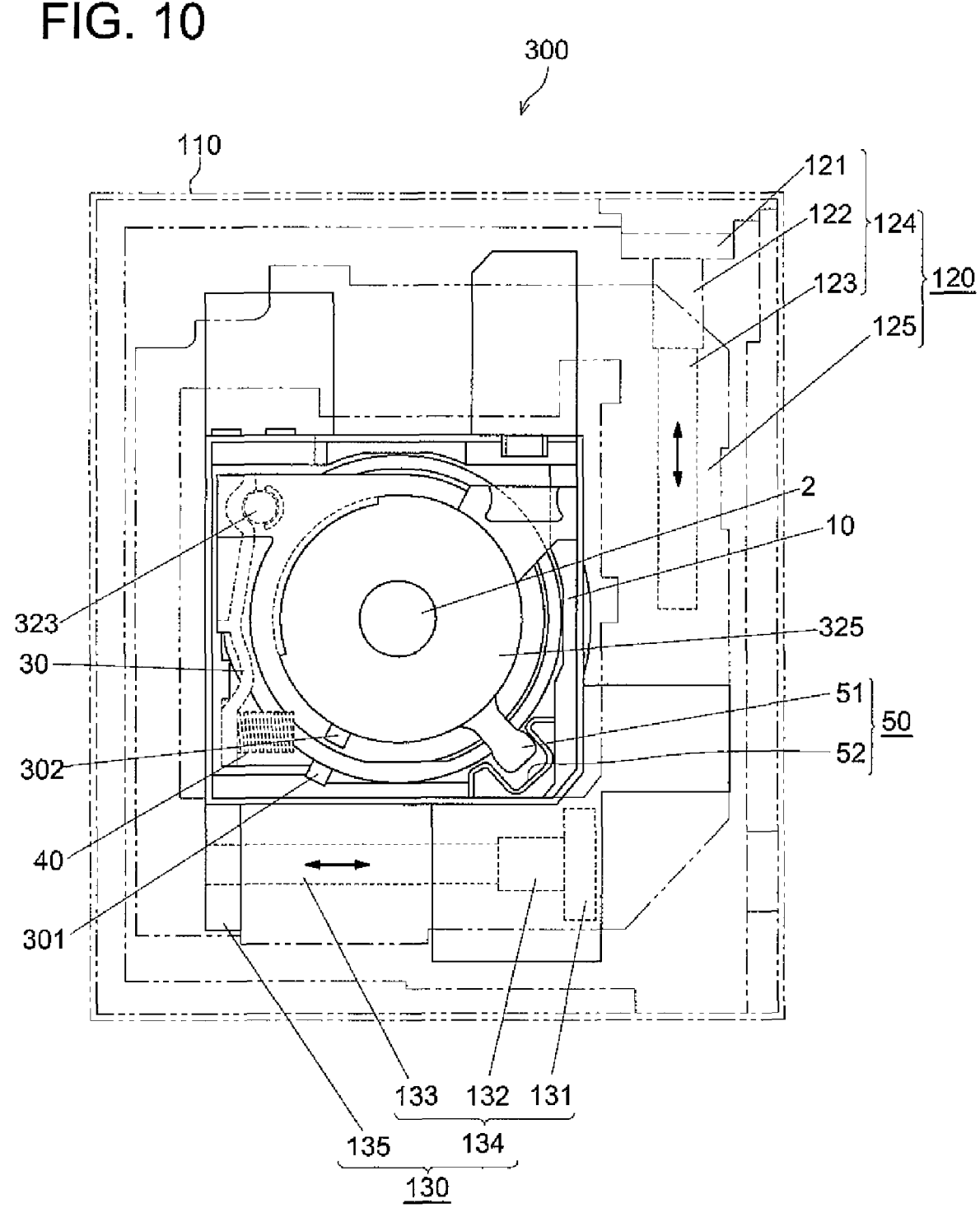
FIG. 10 is a schematic front view to show the structure of relevant portions of an imaging unit relating to Embodiment 3.
Figure 11:
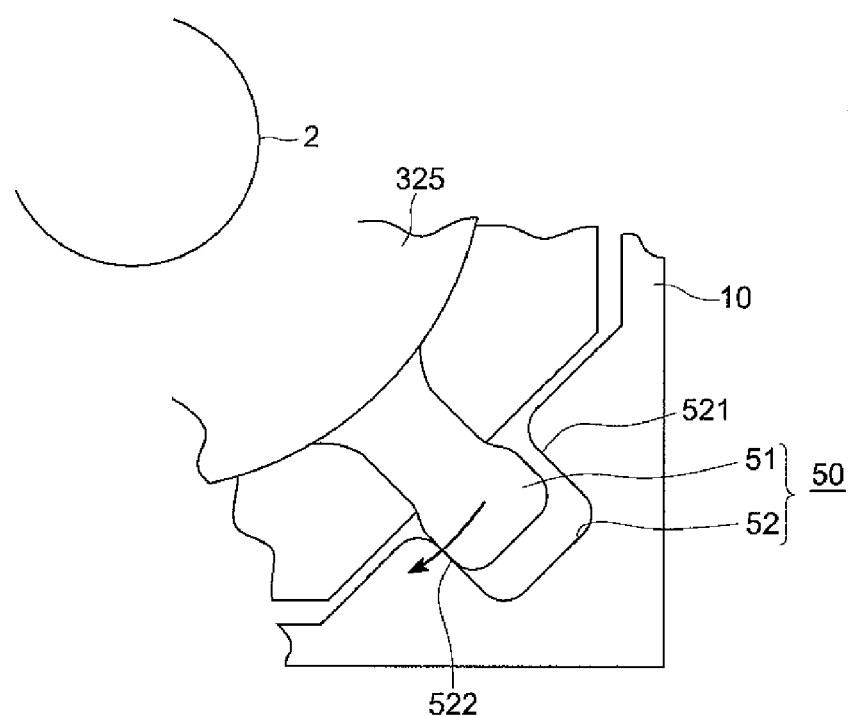
FIG. 11 is an enlargement of relevant portions of the imaging unit relating to Embodiment 3.
Figure 12:
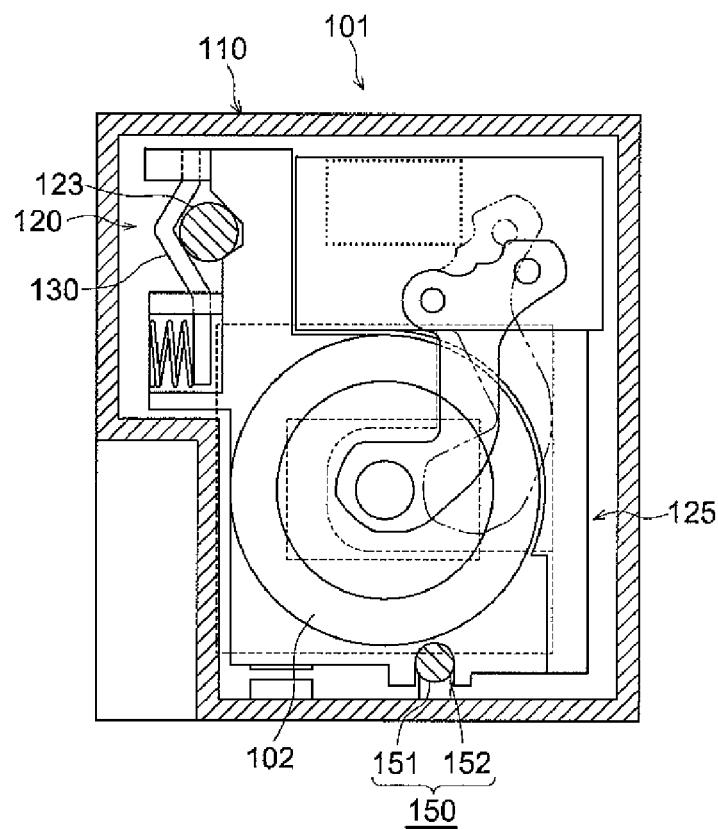
FIG. 12 is a front view to show the structure of a conventional imaging unit.

In FIG. 10, permanent magnet 301 is mounted on an inner surface of lens housing 10, and iron member 302 is mounted at an end portion of moving member 325, facing permanent magnet 301. Due to the attractive forces between permanent magnet 301 and iron member 302, moving member 325, which supports lens 2, is pushed in the clockwise direction around driving shaft 323, shown in FIG. 11, whereby convex section 51 of rotation regulating section 50 is continuously pushed against inner surface 522 of concave section 52. This structure effectively prevents lens 2 and moving member 325, which supports lens 2, from rotating around optical axis X.

For image capturing, when piezoelectric element 22 is activated at predetermined driving timing, based on driving signals coming from the control section, which is not illustrated, driving shaft 223 vibrates in optical axial direction X so that moving member 225 moves in optical axial direction X by inertia and friction force.

According to imaging unit 300 of Embodiment 3, the same effects as in Embodiments 1 and 2 are attained, and the pushing section can be structured by using the attractive force between permanent magnet 301 mounted on lens housing 10 and iron member 302 mounted on moving member 325.

Further, it is a simple matter of course to reverse permanent magnet 301 and iron member 302, and since the magnetic body is not limited to iron member 302, various other magnetic bodies can be used in Embodiment 3.

Still further, the magnetic body, arranged to face permanent magnet 301, can be a magnet exhibiting the same or the opposite polarity as permanent magnet 301.

Still further, permanent magnet 301 (serving as the pushing section) may have a structure to push lens 2 in either rotating direction around optical axis X. That is, as shown in FIG. 11, lens 2 is pushed in the clockwise direction around optical axis X by the attractive force between permanent magnet 301 and iron member 302. However, a structure is also possible to configure to push convex section 51 against inner surface 521, so that lens 2 is pushed in the counterclockwise direction around driving shaft 23.

Concerning Embodiments 2 and 3, convex section 51 and concave section 52 of rotation regulating section 50 can be reversed. That is, convex section 51 mounted on moving members 225 and 325 can be changed to a concave section, while concave section 52 mounted on lens housing 10 can be changed to a convex section, so that both sections 51 and 52 can engage each other and the convex section moves smoothly in the concave section, obtaining the same effects as in Embodiments 1-3.

Concerning the electro-mechanical transduction element, other than piezoelectric element 22 shown in Embodiments 1-3, such as an electrostriction element, can be used, which is elongated and contracted by applying electric voltage.

Imaging units 1, 200, and 300 in Embodiments 1-3 are detailed to be installed as the electric device in cellular phone 100, however, they can also be installed in various other electric devices, such as a digital camera and a PDA (namely a Personal Digital Assistance).

Concerning the targeted effects of the present invention, the back-lash in the rotating direction of the lens around the optical axis can be prevented by the back-lash preventing section. When the camera-shake, generated by the operator, is corrected by the camera-shake correcting section, any undesired movement, generated by the back-lash of moving members and the lens against the lens housing within the device, can be effectively prevented. Accordingly, any adverse shift of the captured images during the image capture, caused by the camera-shake correcting section during image capturing, is effectively prevented. In the imaging unit, carrying the movable lens and the camera-shake correcting section, the present invention can offer a competitive imaging unit to capture images of higher than current quality.

What is claimed is:

1. An imaging unit, comprising:
    a lens housing section to accommodate a lens;
    a lens driving section, including:
        a moving member which supports the lens and moves the lens in an optical axial direction, and
        an electromechanical transduction element to drive the moving member in the optical axial direction;
    a camera-shake preventing section which drives the lens housing section to prevent camera-shake; and
    a rotation regulating section to prevent a back-lash movement of the lens caused by the camera-shake preventing section and to prevent the lens from rotating around an optical axis.

2. The imaging unit of claim 1, wherein the rotation regulating section includes:
    a driving shaft, arranged along the optical direction, and frictionally engaging the moving member, wherein the driving shaft includes more than two different gauging configurations in a cross sectional view perpendicular to an axial direction of the driving shaft; and
    an engaging section whose cross sectional view perpendicular to the axial direction of the driving shaft has the same shape as the driving shaft, slidably engaging the driving shaft.

3. The imaging unit of claim 2, wherein the driving shaft is polygonal in a cross section perpendicular to the axial direction of the driving shaft, and the engaging section is polygonal, and has the same shape as the driving shaft in a cross section perpendicular to the axial direction of the engaging section.

4. The imaging unit of claim 1, wherein the rotation regulating section includes an urging section to push the lens in at least one rotating direction around the optical axis.

5. The imaging unit of claim 4, wherein the urging section includes a spring member whose one end is latched on an inner surface of the lens housing section, while the other end is latched on the moving member.

6. The imaging unit of claim 4, wherein the urging section includes a magnet, mounted on either one of the lens housing section and the moving member, and includes another magnet or a magnetic body, mounted on either one of the lens housing section and the moving member, on which the magnet is not mounted.

7. An electronic device comprising the imaging unit of claim 1.

* * * * *